Patented Mar. 4, 1941

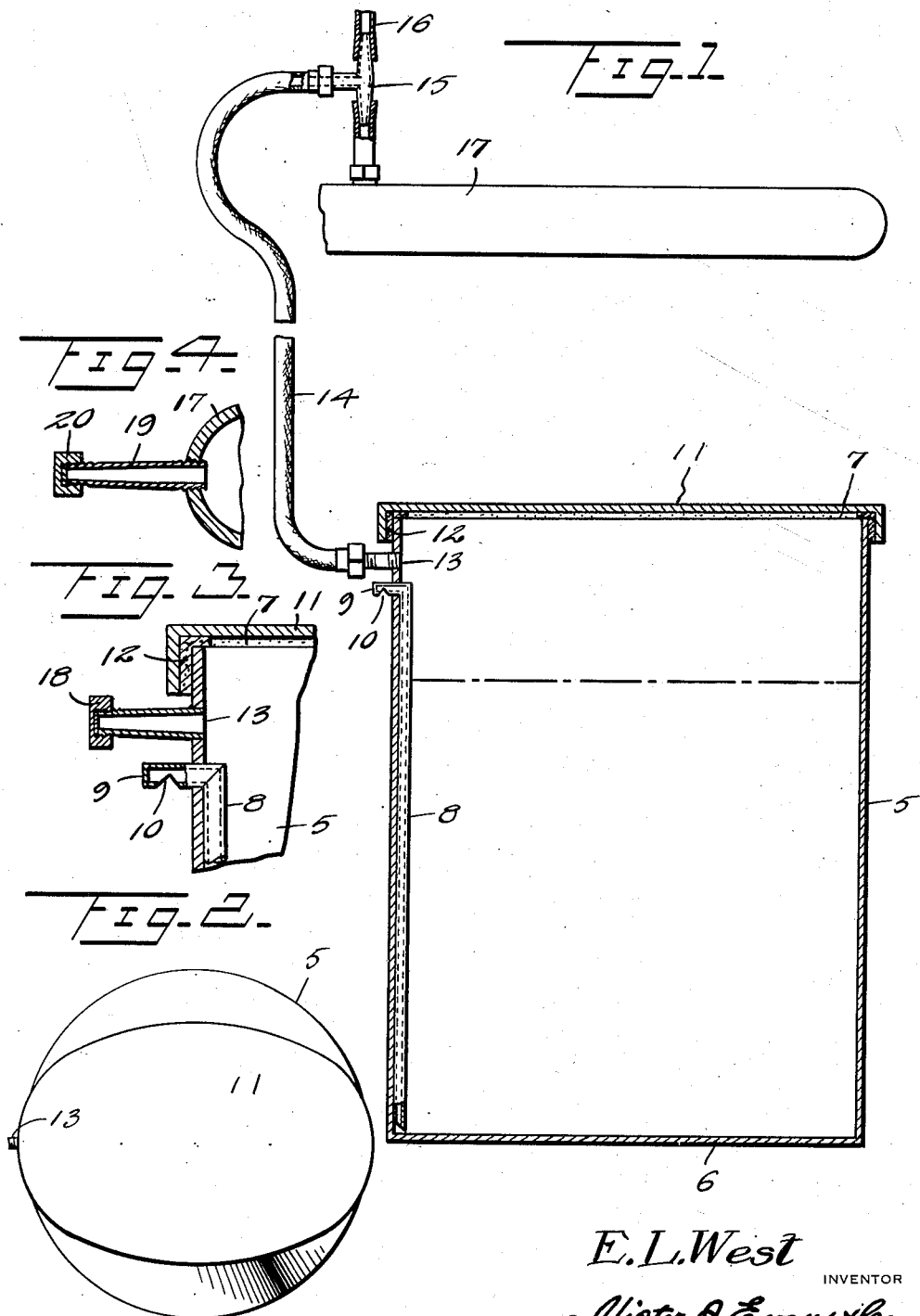

2,233,564

UNITED STATES PATENT OFFICE 2,233,564

MEANS FOR PRESERVING FISH AND OTHER MARINE LIFE WHILE ON LONG TRIPS BY MOTOR VEHICLE OR BOAT

Elmer L. West, Springfield, Mo.

Application June 5, 1939, Serial No. 277,540

1 Claim. (Cl. 43—56)

My invention relates to means for preserving fish and other marine life used by fishermen while on long trips by motor vehicle or boat.

One of the principal objects of my invention is to provide a novel device for preserving fish and other marine life which is so constructed and arranged that the fish or the like are adequately supplied with oxygen introduced into the water in which they are contained.

Another object of my invention is to provide a device of the character described so constructed and arranged that foul air is withdrawn and the liquid aerated.

A further object of my invention is to provide a device of the character described which is simple in construction, durable in use, efficient in operation and economical in manufacture.

Other objects and advantages will be apparent from the following description, appended claim and annexed drawing.

Referring to the drawing wherein like reference characters designate like parts throughout the several views:

Figure 1 is a vertical sectional view of my invention illustrating the latter connected to the manifold of an engine.

Figure 2 is a top plan view thereof.

Figure 3 is a detail enlarged sectional view of the upper side section of the container and illustrating the arrangement of the tube with respect to the nipple.

Figure 4 is a side elevation of a modified form of connection as applied to a manifold, the latter being shown in section.

In practicing my invention, as shown in Figures 1 to 3 of the drawing, I provide a container 5 having a closed bottom 6 and an open top 7. Arranged within the container is a tube 8 fixed to the inner face of the side wall thereof, the lower end of said tube being angled and terminating superjacent the bottom 6. The upper end of the tube 8 is fashioned with a right angularly disposed section 9 extending through the side of the container subjacent the top thereof and communicating with the atmosphere. The outer end of the section 9 is closed and the under side fashioned with a V-shaped inlet port 10 whereby air is introduced into the tube 8. The top of the container 5 is provided with a cover 11, the latter being provided with a gasket 12 to effect a tight fit with said container, both the top of the container and the cover 11 being of an oval configuration.

Between the top 7 and section 9 of the tube 8, the side of the container is provided with an outlet connection or nipple 13, the outer end of which is threaded and receives thereon one end of a flexible tube 14, the opposite end of which is threadedly connected to a T 15 interposed in the windshield wiper conduit 16, the latter being connected to the intake manifold 17 of an engine (not shown). Obviously, operation of the engine serves to exhaust air from the container 5 through the tube 14 and connection 13.

When the container 5 is transported, for instance from a motor vehicle to a motor-boat, the tube 14 is disconnected from the nipple 13 and the nipple 13 closed by a cap 18 threaded thereon as illustrated in Figure 3. In instances where the manifold 17 of the engine is not equipped with a windshield wiper conduit and connection, the manifold is provided with a nipple 19 for connection with the tube 14. When the tube 14 is disconnected from the nipple 19 the latter is closed by a cap 20 threaded thereon as clearly illustrated in Figure 4 of the drawing.

In use, the container is provided with water, the level of the latter being subjacent to the section 9 of the tube 8 and fish or other suitable marine life to be preserved and transported is introduced into the water. When the container is thus supplied with fish or the like, the outlet connection 13 is connected to the intake manifold 17 of the engine and the latter operated, thereby exhausting foul air from within the container and between the level of the water and cover 11. When the air is thus exhausted from the container, fresh air will be drawn into the bottom of the container through the tube 8 and aerate the water therein and supply the container with sufficient oxygen to maintain the fish therein in a live condition. Air thus introduced in the container serves not only to aerate the water but to agitate the same as it is drawn towards the top of the container. It is to be understood that the bores of the tube 8, nipple 13 and T 15 or the nipple 19 are each of a diameter to effect proper operation of the device and without interfering with the proper functioning of the engine.

From the foregoing it will be apparent that I have provided a simple and efficient device whereby fish and other marine life may be preserved in a live condition on long trips.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in various forms, and that the invention comprehends all construction within the scope of the appended claim.

What I claim is:

A device of the character described, comprising, a single container, a removable top normally sealed to said container, an outlet connection carried by said container for permitting air to be exhausted therefrom and constituting the sole means through which air is exhausted from said container when said top is sealed to said container, a tube within said container and having a lower end terminating adjacent the bottom of said container, and an upper end formed with a section extending through the side of and without said container and subjacent said connection whereby when air is exhausted from the container through said connection air is introduced into the bottom of said container through said tube to aerate water within the container and below said section.

ELMER L. WEST.